(12) United States Patent
Guo et al.

(10) Patent No.: US 11,366,347 B2
(45) Date of Patent: Jun. 21, 2022

(54) DISPLAY DEVICE AND METHOD FOR MANUFACTURING SAME

(71) Applicants: BEIJING BOE DISPLAY TECHNOLOGY CO., LTD., Beijing (CN); BOE TECHNOLOGY GROUP CO., LTD., Beijing (CN)

(72) Inventors: Junjie Guo, Beijing (CN); Zhihua Sun, Beijing (CN); Jian Li, Beijing (CN)

(73) Assignees: BOE Technology Group Co., LTD, Beijing (CN); Beijing BOE Display Technology Co., LTD., Beijing (CN)

( * ) Notice: Subject to any disclaimer, the term of this patent is extended or adjusted under 35 U.S.C. 154(b) by 0 days.

(21) Appl. No.: 17/213,275

(22) Filed: Mar. 26, 2021

(65) Prior Publication Data

US 2021/0397036 A1 Dec. 23, 2021

(30) Foreign Application Priority Data

Jun. 17, 2020 (CN) .......................... 202010553680.5

(51) Int. Cl.
*G02F 1/1333* (2006.01)
(52) U.S. Cl.
CPC .. *G02F 1/133314* (2021.01); *G02F 1/133308* (2013.01); *G02F 1/133317* (2021.01); *G02F 2202/28* (2013.01)

(58) Field of Classification Search
None
See application file for complete search history.

(56) References Cited

U.S. PATENT DOCUMENTS

2016/0154271 A1* 6/2016 Kim ...................... G06F 1/1643
349/58

* cited by examiner

*Primary Examiner* — Richard H Kim
(74) *Attorney, Agent, or Firm* — Fay Sharpe LLP (57) ABSTRACT

A display device includes: a back plate, wherein the back plate is provided with an L-shaped bent portion, the bent portion including a bottom plate and a side plate; a display panel, wherein the display panel is disposed on one side of the side plate distal from the bottom plate, an orthographic projection of the display panel on the bottom plate is partially overlapped with an orthographic projection of the side plate on the bottom plate; and an adhesive layer, wherein the adhesive layer is configured to bond a non-light-emitting surface of the display panel to a surface of the side plate distal from the bottom plate, and the adhesive layer is further configured to bond to a side surface of the display panel, wherein the side surface is configured to connect a light-emitting surface and the non-light-emitting surface of the display panel.

19 Claims, 5 Drawing Sheets

DISPLAY DEVICE AND METHOD FOR MANUFACTURING SAME

CROSS-REFERENCE TO RELATED APPLICATION

This application is based on and claims priority to Chinese Patent Application No. 202010553680.5, filed on Jun. 17, 2020, and entitled "DISPLAY DEVICE AND METHOD FOR MANUFACTURING SAME," the disclosure of which is herein incorporated by reference in its entirety.

TECHNICAL FIELD

The present disclosure relates to the field of display technologies, and in particular, relates to a display device and a method for manufacturing the same.

BACKGROUND

Most liquid crystal display televisions (LCD TVs) have a front frame. An LCD TV is generally fabricated by assembling a back plate, a backlight, an LCD panel, and a front frame. With rapid increase of the society and the living standards, consumers are imposing higher and higher requirements on the appearance and performance of the LCD TVs. In this case, front-frameless TVs and even borderless TVs have been manufactured.

SUMMARY

Embodiments of the present disclosure provide a display device and a method for manufacturing the same.

In one aspect of the embodiments of the present disclosure, a display device is provided. The display device includes:

a back plate, wherein the back plate is provided with an L-shaped bent portion, the bent portion including a bottom plate and a side plate;

a display panel, wherein the display panel is disposed on one side of the side plate distal from the bottom plate, an orthographic projection of the display panel on the bottom plate is partially overlapped with an orthographic projection of the side plate on the bottom plate; and an adhesive layer, wherein the adhesive layer is configured to bond a non-light-emitting surface of the display panel to a surface of the side plate distal from the bottom plate, and the adhesive layer is further configured to bond to a side surface of the display panel, the side surface being configured to connect a light-emitting surface and the non-light-emitting surface of the display panel.

In addition, the display device may further have the following additional technical features:

In some embodiments, an orthographic projection of the adhesive layer on the bottom plate is staggered from an orthographic projection of a display region of the display panel on the bottom plate.

In some embodiments, the orthographic projection of the side plate on the bottom plate is staggered from an orthographic projection of a display region of the display panel on the bottom plate.

In some embodiments, the display device further includes a middle frame, wherein the middle frame is received inside a cavity enclosed by the back plate and the display panel, and the middle frame is in contact with a surface of the adhesive layer facing the cavity.

In some embodiments, a surface of the middle frame distal from the bottom plate is in contact with the non-light-emitting surface of the display panel.

In some embodiments, the middle frame is further in contact with a surface of the side plate facing the cavity.

In some embodiments, the middle frame is made of a plastic material.

In some embodiments, a surface of the middle frame distal from the bottom plate is 0.2 mm to 1 mm above the surface of the side plate distal from the bottom plate.

In some embodiments, the back plate and the display panel enclose a cavity, a protrusion is formed on one side, proximal to the cavity, of the surface of the side plate distal from the bottom plate, and the protrusion is in contact with a surface of the adhesive layer facing the cavity.

In some embodiments, a top end of the protrusion is in contact with the non-light-emitting surface of the display panel.

In some embodiments, the adhesive layer is obtained by curing a paste-like adhesive material.

In some embodiments, the adhesive layer is obtained by curing an opaque optical clear resin (OCR).

In some embodiments, a height difference between a surface of the adhesive layer distal from the bottom plate and the light-emitting surface of the display panel is within a range of [−0.5 mm, 0.5 mm].

In some embodiments, a distance between an outer edge of an orthographic projection of the adhesive layer on the bottom plate and an outer edge of the orthographic projection of the side plate on the bottom plate is within a range of [−0.5 mm, 0.5 mm].

In some embodiments, either a fillet or a chamfer is formed at a corner of the adhesive layer not in contact with the display panel or the side plate.

In another aspect of the embodiments of the present disclosure, a method for manufacturing a display device. The method includes:

obtaining a back plate, wherein the back plate is provided with an L-shaped bent portion, the bent portion including a bottom plate and a side plate;

fastening a fixture to an outer surface of the side plate, wherein a surface of the fixture distal from the bottom plate is above a surface of the side plate distal from the bottom plate;

fastening a display panel to one side of the side plate distal from the bottom plate, such that an orthographic projection of the display panel on the bottom plate is partially overlapped with an orthographic projection of the side plate on the bottom plate, and the surface of the fixture distal from the bottom plate is above a light-emitting surface of the display panel;

filling a cavity defined by the fixture, the side plate, and the display panel with an adhesive material, such that the adhesive material bonds a non-light-emitting surface of the display panel to the surface of the side plate distal from the bottom plate, and the adhesive material is bonded to a side surface of the display panel, wherein the side surface is configured to connect the light-emitting surface and the non-light-emitting surface of the display panel; and obtaining an adhesive layer by curing the adhesive material, and obtaining the display device by removing the fixture.

In addition, the method may further have the following additional technical features:

In some embodiments, before the fastening a display panel to one side of the side plate distal from the bottom plate, the method further includes:

placing a middle frame inside a cavity enclosed by the back plate and the display panel;

wherein the middle frame is in contact with a surface of the adhesive layer facing the cavity.

In some embodiments, the back plate and the display panel enclose a cavity, a protrusion is formed on one side, proximal to the cavity, of the surface of the side plate distal from the bottom plate, and the protrusion is in contact with a surface of the adhesive layer facing the cavity.

In some embodiments, a distance between a side surface of the display panel and a side surface of the fixture proximal to the display panel is not less than 0.5 mm.

In some embodiments, one end of the fixture distal from the bottom plate is provided with a bent structure, and the bent structure is configured to press a corner of the adhesive layer not in contact with the display panel or the side plate, such that either a fillet or a chamfer is formed at the corner.

Additional aspects and advantages of the present disclosure are to be partially provided in the following description, and partially become evident in the following description, or understood through the practice of the present disclosure.

DETAILED DESCRIPTION

For clearer descriptions of the objectives, technical solutions, and advantages of the present disclosure, the following describes the embodiments of the present disclosure in detail. A person skilled in the art will understand that the following embodiments are intended to explain the present disclosure, and the described embodiments are merely some embodiments of the present disclosure, but not all of the embodiments, and should not be considered as limiting the present disclosure. Apparently, all other embodiments obtained by a person of ordinary skill in the art based on the embodiments of the present disclosure without creative efforts shall fall within the protection scope of the present disclosure. Unless otherwise specified, if specific technologies or conditions are not explicitly described in the following embodiments, a person skilled in the art can proceed in accordance with the commonly used technologies or conditions in the art or in accordance with product specifications.

In a display device without a front frame, a display panel is usually glued to an extension portion of a middle frame through a double-sided adhesive foam tape, such that the conventional front frame is omitted and the display device is more beautiful. However, in such a display device without a front frame, a distance from a display region to an edge of the display device (that is, a width of a non-display region) is usually greater than 6 mm. In addition, bonding strength between a display panel and the extension portion of the middle frame can be ensured only when a width of the double-sided adhesive foam tape reaches at least 3 mm. However, a width of a non-display region of a full-view display device is usually less than 1 mm. If the bonding method for the display device without a front frame is used, the bonding strength of the display panel cannot be ensured.

Figure 1:
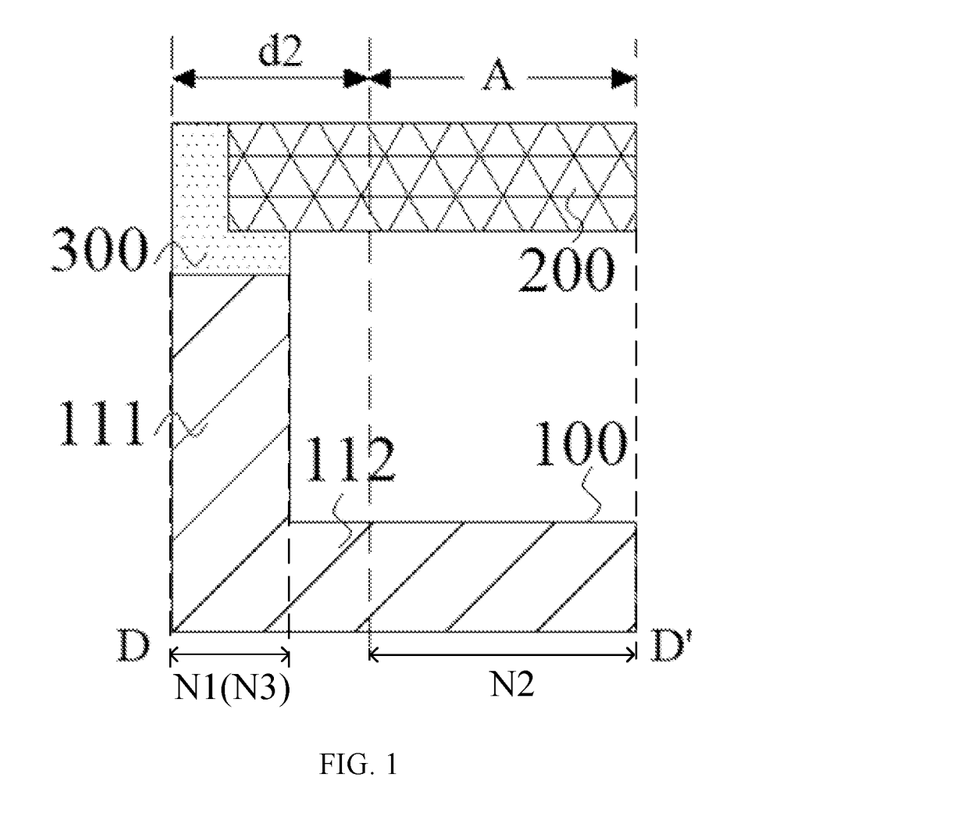
FIG. 1 is a schematic structural partial cross-sectional view of a display device according to an embodiment of the present disclosure.
Figure 2:
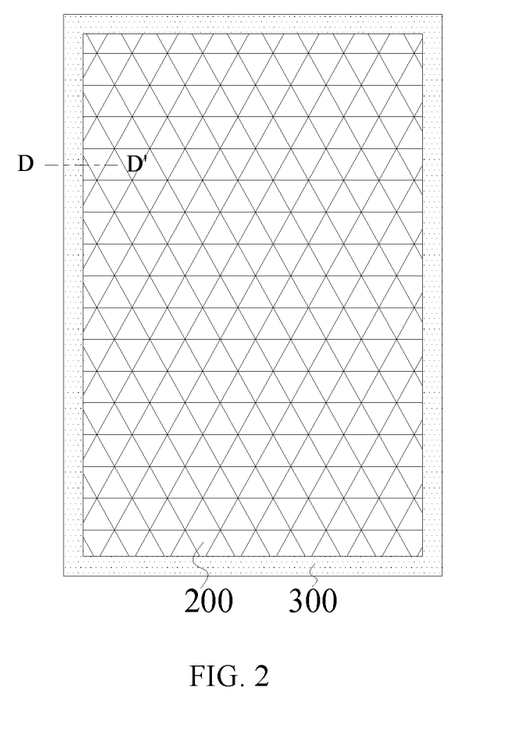
FIG. 2 is a schematic structural top view of a display device according to an embodiment of the present disclosure.

An embodiment of the present disclosure provides a display device. FIG. 1 is a schematic structural cross-sectional view along a line DD' (in a direction perpendicular to a light-emitting surface of a display panel) in FIG. 2. FIG. 2 is a schematic structural top view of a display device according to an embodiment of the present disclosure. As shown in FIG. 1, the display device includes:

a back plate 100, wherein the back plate 100 is provided with an L-shaped bent portion, the bent portion including a bottom plate 112 and a side plate 111, and the back plate 100 is configured to cover a non-light-emitting surface of a display panel 200, to be specific, a backlight and the like disposed on a side of the non-light-emitting surface of the display panel 200 and the display panel 200 are wrapped in a space formed by the back plate 100, wherein a light-emitting surface of the display panel is a surface of the display panel used for display and is also referred to as a display surface, and the non-light-emitting surface is a surface opposite to the display surface;

the display panel 200, wherein the display panel 200 is disposed on one side of the side plate 111 distal from the bottom plate 112, and an orthographic projection of the display panel 200 on the bottom plate 112 is partially overlapped with an orthographic projection of the side plate 111 on the bottom plate 112; and an adhesive layer 300, wherein the adhesive layer 300 is configured to bond the non-light-emitting surface of the display panel 200 to a surface of the side plate 111 distal from the bottom plate 112, and the adhesive layer 300 is further configured to bond to a side surface of the display panel 200, wherein the side surface is configured to connect the light-emitting surface and the non-light-emitting surface of the display panel 200.

In this way, the adhesive layer 300 may be considered to include a side adhesive layer and a bottom adhesive layer. The side adhesive layer is bonded to the side surface of the display panel 200. The bottom adhesive layer bonds the non-light-emitting surface of the display panel 200 to the surface of the side plate 111 distal from the bottom plate 112. Through adhesion of the side adhesive layer and the bottom adhesive layer, the adhesive layer 300 can both bond the non-light-emitting surface of the display panel 200 and wrap sides of the side surface of the display panel 200, such that the display panel 200 can be more firmly bonded, and there is no need to dispose a front frame in the display device, thereby making the display device more beautiful, and further preventing corners of the display panel 200 from causing injuries such as cuts compared with a display device provided with no side adhesive layer. Further, a width by which the bottom adhesive layer is in contact with a lower surface of the display panel 200 may not exceed 1 mm. A direction of the width is parallel to a direction of a width of a non-display region. This can enable a distance from a display region A to an edge of the display device to be less than 1 mm, thereby meeting a full-view or even ultimate borderless design trend.

As can be learned from the above, in the display device provided in the present disclosure, the adhesive layer 300 is not only bonded to the non-light-emitting surface of the display panel 200, but also bonded to the side surface of the display panel 200. This can increase a bonding region between the adhesive layer 300 and the display panel 200, such that solidity of the bonding between the adhesive layer 300 and the display panel 200 can be enhanced by increasing the boding region therebetween, thereby ensuring bonding strength of the display panel 200.

In some embodiments, a height by which the side adhesive layer is in contact with the side surface of the display panel 200 is approximately 1 mm. A direction of the height is parallel to a direction of a height of the side surface of the display panel 200. In addition, a height difference between a surface of the adhesive layer 300 distal from the bottom plate 112 and the light-emitting surface of the display panel 200 is within a range of [−0.5 mm, 0.5 mm]. In this way, not only the adhesive layer 300 can bond the non-light-emitting surface and the side surface of the display panel 200, but also the surface of the adhesive layer 300 distal from the bottom plate 112 is substantially flush with the light-emitting surface of the display panel 200, thereby making the appearance of the display device better.

In addition, a distance between an outer edge of an orthographic projection of the adhesive layer 300 on the bottom plate 112 and an outer edge of the orthographic projection of the side plate 111 on the bottom plate 112 is within a range of [−0.5 mm, 0.5 mm]. In this way, a surface of the side adhesive layer distal from the display panel 200 is substantially flush with a surface of the side plate 111 distal from the display panel 200, thereby further ensuring the appearance effect of the display device.

In this embodiment of the present disclosure, the adhesive layer 300 is obtained by curing an opaque adhesive material. In some embodiments, the adhesive layer 300 may be formed by curing an opaque OCR, that is, the adhesive layer 300 may have a color. For example, the adhesive layer 300 may be formed by curing a black OCR. In this way, the black adhesive layer 300 can further prevent light leakage, thereby further improving display performance of the display device. The color of the adhesive layer 300 may be produced by adding colored materials such as colorants or chemical agents to the adhesive material. In addition, the color of the adhesive layer 300 may be adjusted according to an application requirement. For example, the color of the adhesive layer 300 may be a color that is more acceptable to a user while the color can prevent light leakage, such that the appearance around the display panel 200 is more beautiful.

In some embodiments, the orthographic projection of the side plate 111 on the bottom plate 112 is staggered from an orthographic projection of a display region of the display panel 200 on the bottom plate 112. For example, as shown in FIG. 1, N1 represents the orthographic projection of the side plate 111 on the bottom plate 112, and N2 represents the orthographic projection of the display region of the display panel 200 on the bottom plate 112. It can be learned from FIG. 1 that, there is no overlapping part between N1 and N2, that is, the orthographic projection of the side plate 111 on the bottom plate 112 is staggered from the orthographic projection of the display region of the display panel 200 on the bottom plate 112. In this way, the side surface exerts no impact on the backlight providing the display panel 200 with light required for display, thereby ensuring display performance of the display panel 200.

In addition, the orthographic projection of the adhesive layer 300 on the bottom plate 112 is staggered from the orthographic projection of the display region of the display panel 200 on the bottom plate 112. For example, as shown in FIG. 1, N3 represents the orthographic projection of the adhesive layer 300 on the bottom plate 112, and N2 represents the orthographic projection of the display region of the display panel 200 on the bottom plate 112. It can be learned from FIG. 1 that, there is no overlapping part between N3 and N2, that is, the orthographic projection of the adhesive layer 300 on the bottom plate 112 is staggered from the orthographic projection of the display region of the display panel 200 on the bottom plate 112. It can be learned that the adhesive layer 300 does not enter the display region, such that the adhesive layer 300 exerts no impact on the backlight providing the display panel 200 with light required for display, thereby ensuring the display performance of the display panel 200.

Further, in this embodiment of the present disclosure, the orthographic projection of the side plate 111 on the bottom plate 112 may cover an orthographic projection of the bottom adhesive layer on the bottom plate 112. In other words, the orthographic projection of the side plate 111 on the bottom plate 112 may be overlapped with the orthographic projection of the bottom adhesive layer on the bottom plate 112, or the orthographic projection of the bottom adhesive layer on the bottom plate 112 may be received inside the orthographic projection of the side plate 111 on the bottom plate 112. When the orthographic projection of the side plate 111 on the bottom plate 112 is overlapped with the orthographic projection of the bottom adhesive layer on the bottom plate 112, the adhesive layer 300 can be more fully in contact with the side plate 111, such that the side plate 111 can be more firmly bonded to the display panel 200.

The orthographic projection of the adhesive layer 300 on the bottom plate 112 is staggered from the orthographic projection of the display region of the display panel 200 on the bottom plate 112 based on some settings of the display device. In this embodiment of the present disclosures, the practice of the staggering of the orthographic protections is described by using the following three examples.

Figure 3:
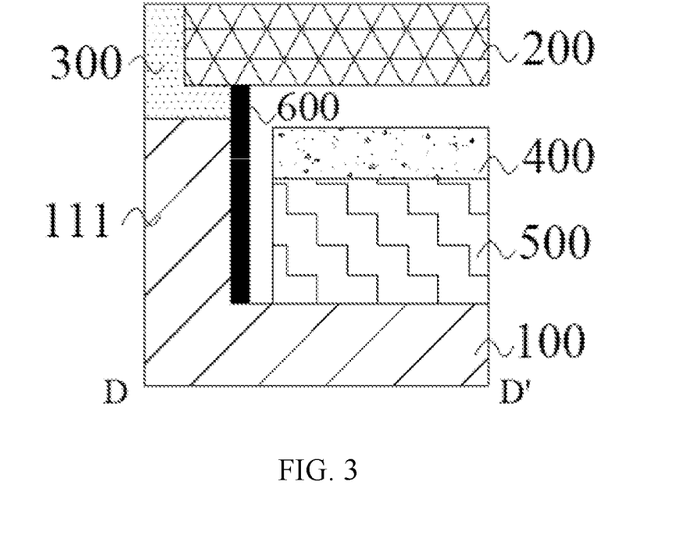
FIG. 3 is a schematic structural partial cross-sectional view of another display device according to an embodiment of the present disclosure.

In a first example, as shown in FIG. 3, the display device further includes a middle frame 600. The middle frame 600 is received inside a cavity enclosed by the back plate 100 and the display panel 200, and the middle frame 600 is in contact with a surface of the adhesive layer 300 facing the cavity. If the display device is provided with the middle frame 600, when an adhesive material for forming the adhesive layer 300 is injected, the middle frame 600 can block the adhesive material and prevent the adhesive material from flowing into the cavity enclosed by the back plate 100 and the display panel 200, such that the orthographic projection of the adhesive layer 300 on the bottom plate 112 is staggered from the orthographic projection of the display region of the display panel 200 on the bottom plate 112. In other words, the middle frame 600 is configured to restrict the adhesive layer 300 from flowing into the cavity, such that the adhesive material can be prevented from entering the backlight, thereby ensuring that the display device has better display picture quality, and a higher yield rate is achieved.

The function of the middle frame 600 may be implemented by setting a surface of the middle frame 600 distal from the bottom plate 112 above the surface of the side plate 111 distal from the bottom plate 112. Optionally, to effectively ensure the blocking effect of the middle frame 600 on the adhesive layer 300, the surface of the middle frame 600 distal from the bottom plate 112 is in contact with the non-light-emitting surface of the display panel 200. In this way, the non-light-emitting surface of the display panel 200, the middle frame 600, and the side plate 111 can form a relatively closed cavity. When the adhesive material for forming the adhesive layer 300 is injected into the cavity, the middle frame 600 can effectively block the adhesive material, thereby further reducing a probability that the adhesive material flows into the cavity enclosed by the back plate 100 and the display panel 200.

In some embodiments, a surface of the middle frame 600 distal from the bottom plate 112 is 0.2 mm to 1 mm above the surface of the side plate 111 distal from the bottom plate 112. This can help achieve a thin and light design of the display device while ensuring the yield rate of the display device.

In addition, to ensure that the middle frame 600 exerts no impact on the backlight providing the display panel 200 with light required for display, an orthographic projection of the middle frame 600 on the bottom plate 112 is staggered from the orthographic projection of the display region of the display panel 200 on the bottom plate 112.

In addition, the middle frame 600 is further in contact with a surface of the side plate 111 facing the cavity. Alternatively, a surface of the middle frame 600 facing distal from the cavity may be in contact with a surface of the side plate 111 facing the cavity through the adhesive layer 300. When the middle frame 600 is further in contact with the surface of the side plate 111 facing the cavity, the adhesive material can be prevented from flowing into a gap between the side plate 111 and the middle frame 600.

In some embodiments, the middle frame 600 is made of a plastic material or a metal material. For example, the middle frame 600 is made of aluminum, polycarbonate (PC), or acrylonitrile butadiene styrene (ABS). When the middle frame 600 is made of a plastic material, if the back plate 100 collides with a component inside the cavity enclosed by the display panel 200, the middle frame 600 can provide cushioning and reduce damage to the component caused by the collision. For example, when the back plate 100 is made of a metal material such as a hot-dip galvanized steel sheet or an electro-galvanized steel sheet, and the non-light emitting surface of the display panel 200 is made of a glass material, because one end of the middle frame 600 is in contact with the non-light-emitting surface of the display panel 200 and the other end of the middle frame 600 is in contact with the bottom plate 112, when the display panel 200 falls down, the middle frame 600 can provide cushioning between the bottom plate 112 and the display panel 200, thereby improving durability respect to impact of the display device.

Figure 4:
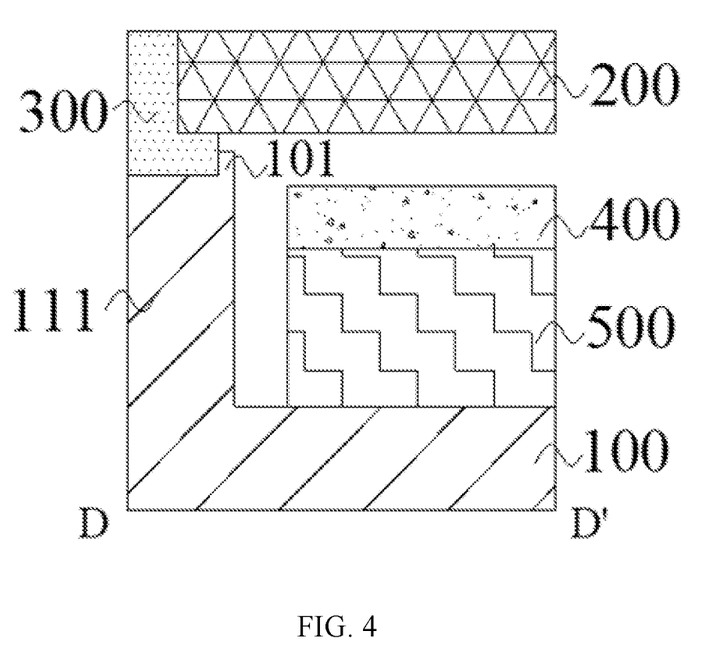
FIG. 4 is a schematic structural partial cross-sectional view of still another display device according to an embodiment of the present disclosure.

In a second example, the back plate 100 and the display panel 200 enclose a cavity. As shown in FIG. 4, a protrusion 101 is formed on one side, proximal to the cavity, of the surface of the side plate 111 distal from the bottom plate 112 and that is proximal to the cavity. The protrusion 101 is in contact with a surface of the adhesive layer 300 facing the cavity. The protrusion 101 is disposed such that when an adhesive material for forming the adhesive layer 300 is injected, the protrusion 101 can block the adhesive material and prevent the adhesive material from flowing into the cavity enclosed by the back plate 100 and the display panel 200, such that the orthographic projection of the adhesive layer 300 on the bottom plate 112 is staggered from the orthographic projection of the display region of the display panel 200 on the bottom plate 112. In other words, the protrusion 101 is configured to restrict the adhesive layer 300 from flowing into the cavity, such that the adhesive material can be prevented from entering the backlight, thereby ensuring that the display device has better display picture quality, and a higher yield rate is achieved.

In some embodiments, to effectively ensure the blocking effect of the protrusion 101 on the adhesive layer 300, a top end of the protrusion 101 is in contact with the non-light-emitting surface of the display panel 200. In this way, the non-light-emitting surface of the display panel 200, the protrusion 101, and the side plate 111 can form a relatively closed cavity. When the adhesive material for forming the adhesive layer 300 is injected into the cavity, the protrusion 101 can effectively block the adhesive material, thereby further reducing a probability that the adhesive material flows into the cavity enclosed by the back plate 100 and the display panel 200.

In a third example, the adhesive layer 300 is obtained by curing a paste-like adhesive material. In this way, the adhesive material coated on the side plate 111 is initially in a form of a paste that does not flow. The orthographic projection of the adhesive layer 300 obtained from the adhesive material on the bottom plate 112 can be controlled to be staggered from the orthographic projection of the display region of the display panel 200 on the bottom plate 112 by controlling a coating position of the adhesive material and an operation of bonding the non-light-emitting surface of the display panel 200 to the adhesive material. For example, the paste-like adhesive may be thermally conductive silicone.

It should be noted that, the above examples for causing the orthographic projection of the adhesive layer 300 on the bottom plate 112 to be staggered from the orthographic projection of the display region of the display panel 200 on the bottom plate 112 may be used separately, or any two or three of the above examples may be used in combination. For example, when the protrusion 101 is formed on the side, proximal to the cavity, of the surface of the side plate 111 distal from the bottom plate 112, the display device may be further provided with the middle frame 600. The protrusion 101 and the middle frame 600 work together to cause the orthographic projection of the adhesive layer 300 on the bottom plate 112 to be staggered from the orthographic projection of the display region of the display panel 200 on the bottom plate 112.

Figure 5:
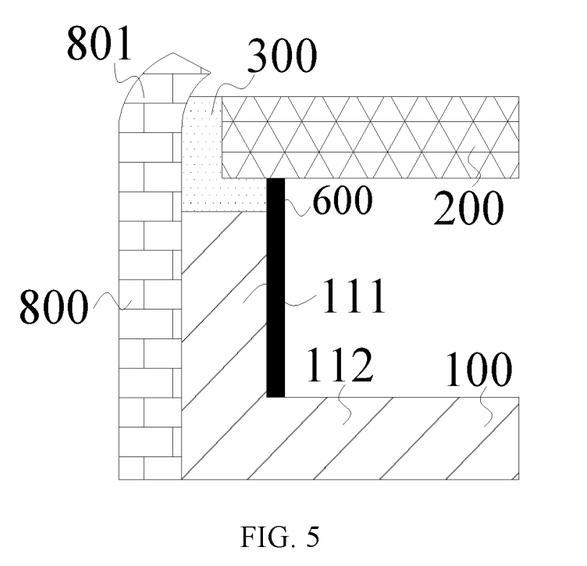
FIG. 5 is a schematic diagram showing that an arc is formed at a corner of an adhesive layer according to an embodiment of the present disclosure.
Figure 6:
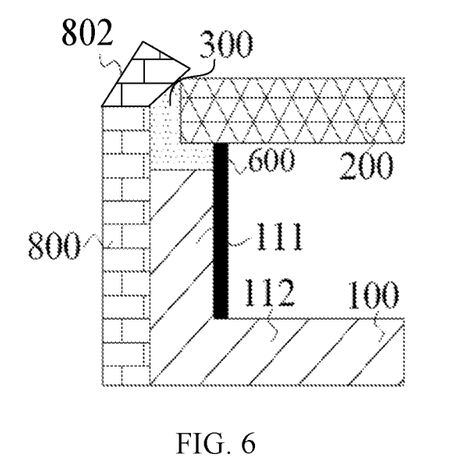
FIG. 6 is a schematic diagram showing that a chamfer is formed at a corner of an adhesive layer according to an embodiment of the present disclosure.

Further, as shown in FIG. 5 and FIG. 6, either a fillet or a chamfer is formed at a corner of the adhesive layer 300 not in contact with the display panel 200 and the side plate 111. In other words, either a fillet or a chamfer is formed at a corner of the adhesive layer 300 disposed on an outer side of the display device. In FIG. 5, a fillet is formed at the corner of the adhesive layer 300 not in contact with the display panel 200 and the side plate 111. In FIG. 6, a chamfer 802 is formed at the corner of the adhesive layer 300 not in contact with the display panel 200 and the side plate 111. In this way, corners of the display panel are blunter and thus stress concentration is reduced, sharpness of the corners is reduced, and the appearance effect of the corners of the display device can be improved. In addition, based on the same concept, the corner of the adhesive layer 300 not in contact with the display panel 200 and the side plate 111 may be set to other shapes according to application requirements. Examples are not exhaustively listed herein.

In conclusion, in the display device provided in this embodiment of the present disclosure, the adhesive layer is not only bonded to the non-light-emitting surface of the display panel, but also bonded to the side surface of the display panel. This can increase a bonding region between the adhesive layer and the display panel, such that solidity of the bonding between the adhesive layer and the display panel can be enhanced by increasing the boding region therebetween, thereby ensuring bonding strength of the display panel, and facilitating borderless design of the display device.

Figure 7:
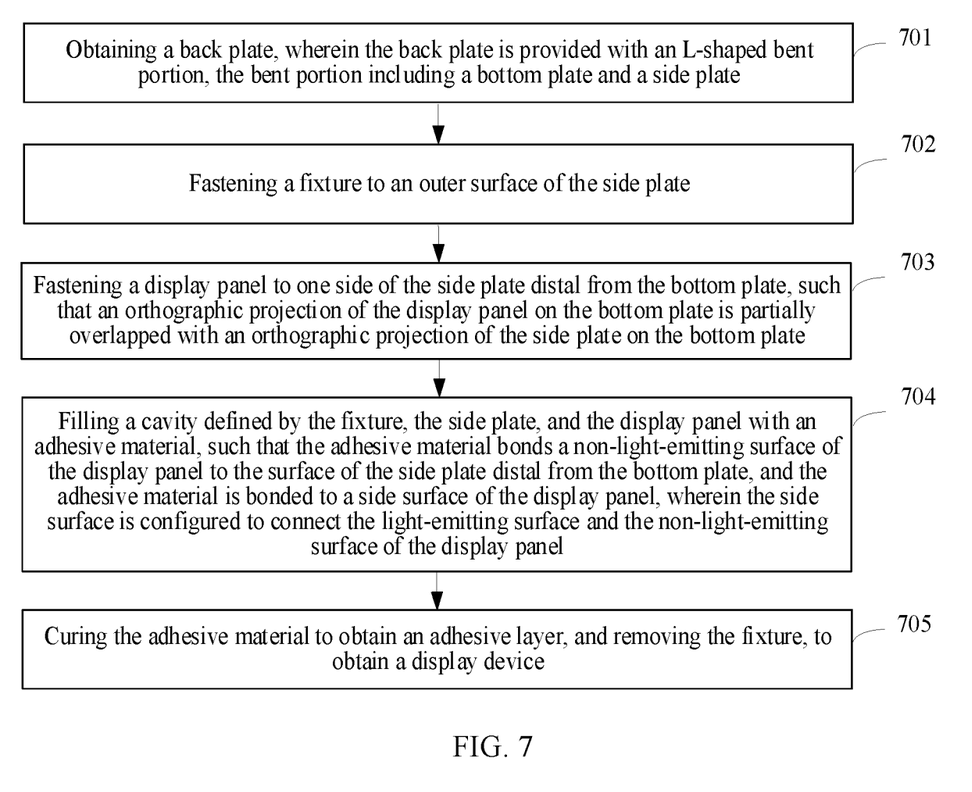
FIG. 7 is a schematic flowchart of a method for manufacturing a display device according to an embodiment of the present disclosure.
Figure 8:
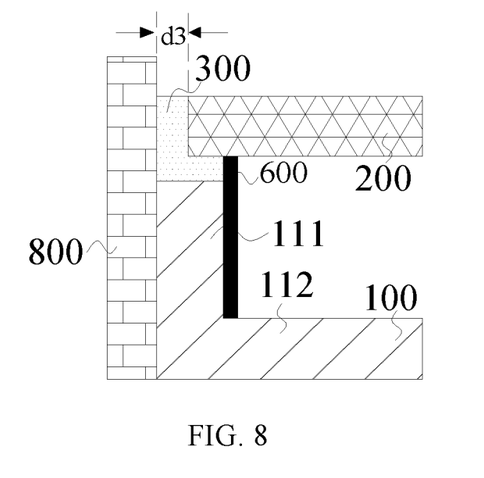
FIG. 8 is a schematic structural partial cross-sectional view of a case after adhesive filling in a manufacturing method according to an embodiment of the present disclosure.

An embodiment of the present disclosure provides a method for manufacturing a display device. Referring to FIG. 7 and FIG. 8, the method includes the following steps.

In step 701, a back plate is obtained, wherein the back plate is provided with an L-shaped bent portion, the bent portion including a bottom plate and a side plate.

In some embodiments, to ensure a protective effect of the back plate on a display panel and a backlight, the back plate is made of a metal material such as a hot-dip galvanized steel sheet or an electro-galvanized steel sheet.

In step 702, a fixture is fastened to an outer surface of the side plate.

In this step, a fixture 800 is fastened to an outer surface of the side plate 111 of the back plate 100, such that the fixture 800 defines a shape of a subsequently formed surface of the adhesive layer 300 proximal to the fixture. A surface of the fixture distal from the bottom plate may be above a surface of the side plate distal from the bottom plate. In this way, an adhesive layer can be formed between a non-light-emitting surface of the display panel and the side plate through a blocking effect of the fixture on an adhesive material.

In some embodiments, one end of the fixture distal from the bottom plate is provided with a bent structure, and the bent structure is configured to press a corner of the adhesive layer not in contact with the display panel or the side plate, such that either a fillet or a chamfer is formed at the corner. For example, as shown in FIG. 5, one end of the fixture 800 distal from the bottom plate 112 is designed as an arc 801. The arc 801 is configured to press a corner of the adhesive layer not in contact with the display panel or the side plate, such that a fillet matching the arc on the fixture is formed at the corner. For example, as shown in FIG. 6, one end of the fixture 800 distal from the bottom plate 112 is designed as a chamfer 802. The chamfer 802 is configured to press a corner of the adhesive layer not in contact with the display panel or the side plate, such that a chamfer matching the chamfer on the fixture is formed at the corner. In this way, the corners of the display device can be more curved, thereby improving the appearance effect of the display device. In addition, based on the same concept, the corner of the adhesive layer not in contact with the display panel or the side plate may be set to other shapes according to application requirements. Examples are not listed herein one by one.

In step 703, a display panel is fastened to one side of the side plate distal from the bottom plate, such that an orthographic projection of the display panel on the bottom plate is partially overlapped with an orthographic projection of the side plate on the bottom plate.

When the orthographic projection of the display panel on the bottom plate is partially overlapped with the orthographic projection of the side plate on the bottom plate, after an adhesive layer is formed between the display panel and the side plate, the adhesive layer can be bonded to the display panel and also bonded to the side plate, thereby implementing bonding between the side plate and the display panel.

In some embodiments, as shown in FIG. 8, a surface of the fixture 800 distal from the bottom plate is above the light-emitting surface of the display panel 200. This can better prevent an adhesive material in a liquid form from overflowing, such that the adhesive material for forming the adhesive layer does not flow along the side of the fixture distal from the display panel, thereby enabling an expected shape to be formed on a surface of the adhesive layer proximal to the fixture.

In addition, as shown in FIG. 8, to ensure the appearance effect of the display device, a distance d3 between the side surface of the display panel 200 and a side surface of the fixture 800 proximal to the display panel may be limited to not less than 0.5 mm. This allows sufficient clearance for a subsequent gluing process. In addition, when the display device is a full-view display device, because a width of a non-display region of a full-view display device is usually less than 1 mm, the distance d3 between the side surface of the display panel 200 and the side surface of the fixture 800 proximal to the display panel may be between 0.5 mm and 1 mm.

Further, the orthographic projection of the side plate on the bottom plate is staggered from an orthographic projection of a display region of the display panel on the bottom plate. In this way, the side surface exerts no impact on the backlight providing the display panel with light required for display, thereby ensuring display performance of the display panel.

In step 704, a cavity defined by the fixture, the side plate, and the display panel is filled with an adhesive material, such that the adhesive material bonds a non-light-emitting surface of the display panel to the surface of the side plate distal from the bottom plate, and the adhesive material is bonded to a side surface of the display panel, wherein the side surface is configured to connect the light-emitting surface and the non-light-emitting surface of the display panel.

In this step, the cavity defined by the fixture, the side plate, and the display panel is filled with the adhesive material, such that an adhesive layer can be formed in the cavity. The adhesive material may be an opaque adhesive material. Optionally, the adhesive material may be an opaque OCR, that is, the adhesive material may be colored. For example, the adhesive material may be a black OCR. In this way, the formed adhesive layer may be black, and the black adhesive layer can prevent light leakage, thereby further improving display performance of the display device. The color of the adhesive material may be produced by adding colored materials such as colorants or chemical agents to the adhesive material. In addition, the color of the adhesive material may be adjusted according to an application requirement. For example, the color of the adhesive material may be a color that is more acceptable to a user while the color can prevent light leakage, such that the appearance around the display panel is more beautiful.

Before step 704 is performed, a volume of the adhesive material that needs to be injected into the cavity defined by the fixture, the side plate, and the display panel may be first calculated based on a distance between the side surface of the display panel and the fixture, a distance between the non-light-emitting surface of the display panel and the surface of the side plate distal from the bottom plate, and a distance between the light-emitting surface of the display panel and the surface of the side plate distal from the bottom plate, and then the adhesive material of the volume is injected into the cavity defined by the fixture, the side plate, and the display panel.

In step 705, an adhesive layer is obtained by curing the adhesive material, and the display device is obtained by removing the fixture.

The curing treatment may include ultraviolet (UV) curing or thermal curing. This can prevent the adhesive material from starting to be cured in the injection process, thereby preventing bubbles from existing in the adhesive layer. In addition, when the curing treatment is UV curing, the display panel can be prevented from being affected by a high temperature, thereby making the manufactured display device more stable in use.

The adhesive layer may be considered to include a side adhesive layer and a bottom adhesive layer. The side adhesive layer is bonded to the side surface of the display panel. The bottom adhesive layer bonds the non-light-emitting surface of the display panel to the surface of the side plate distal from the bottom plate. Through adhesion of the side adhesive layer and the bottom adhesive layer, the adhesive layer can both bond the non-light-emitting surface of the display panel and wrap sides of the side surface of the display panel, such that the display panel can be more firmly bonded, and there is no need to dispose a front frame in the display device, thereby making the display device more beautiful, and further preventing glass corners of the display panel from causing injuries such as cuts compared with a display device provided with no side adhesive layer. Further, a width by which the bottom adhesive layer is in contact with a lower surface of the display panel may not exceed 1 mm. A direction of the width is parallel to a direction of a width of a non-display region. This can enable a distance from a display region A to an edge of the display device to be less than 1 mm, thereby meeting a full-view or even ultimate borderless design trend.

In some embodiments, a height by which the side adhesive layer is in contact with the side surface of the display panel is approximately 1 mm. A direction of the height is parallel to a direction of a height of the side surface of the display panel. In addition, a height difference between a surface of the adhesive layer distal from the bottom plate and the light-emitting surface of the display panel is within a range of [−0.5 mm, 0.5 mm]. In this way, not only the adhesive layer can bond the non-light-emitting surface and the side surface of the display panel, but also the surface of the adhesive layer distal from the bottom plate is substantially flush with the light-emitting surface of the display panel, thereby making the appearance of the display device better.

In addition, a distance between an outer edge of an orthographic projection of the adhesive layer on the bottom plate and an outer edge of the orthographic projection of the side plate on the bottom plate is within a range of [−0.5 mm, 0.5 mm]. In this way, a surface of the side adhesive layer distal from the display panel is substantially flush with a surface of the side plate distal from the display panel, thereby further ensuring the appearance effect of the display device.

In addition, the orthographic projection of the adhesive layer on the bottom plate is staggered from the orthographic projection of the display region of the display panel on the bottom plate. In this way, the adhesive layer does not enter the display region, such that the adhesive layer exerts no impact on the backlight providing the display panel with light required for display, thereby ensuring the display performance of the display panel.

Further, the orthographic projection of the side plate on the bottom plate may cover an orthographic projection of the bottom adhesive layer on the bottom plate. In other words, the orthographic projection of the side plate on the bottom plate may be overlapped with the orthographic projection of the bottom adhesive layer on the bottom plate, or the orthographic projection of the bottom adhesive layer on the bottom plate may be received inside the orthographic projection of the side plate on the bottom plate. When the orthographic projection of the side plate on the bottom plate is overlapped with the orthographic projection of the bottom adhesive layer on the bottom plate, the adhesive layer can be more fully in contact with the side plate, such that the side plate can be more firmly bonded to the display panel.

As can be learned from the above, in the method for manufacturing the display device according to this embodiment of the present disclosure, the manufactured adhesive layer is not only bonded to the non-light-emitting surface of the display panel, but also bonded to the side surface of the display panel. This increases a bonding region between the adhesive layer and the display panel, such that solidity of the bonding between the adhesive layer and the display panel can be enhanced by increasing the boding region therebetween, thereby ensuring bonding strength of the display panel.

Figure 9:
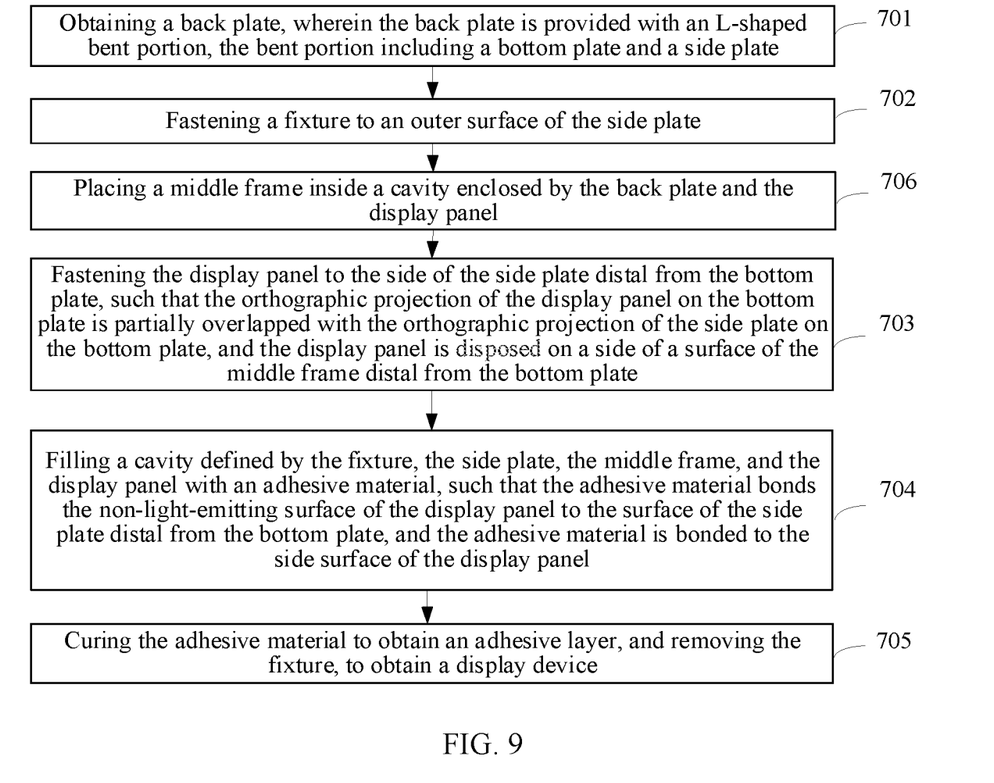
FIG. 9 is a schematic flowchart of another method for manufacturing a display device according to an embodiment of the present disclosure.

In some embodiments, when the display device further includes the middle frame 600, as shown in FIG. 9, before step 703, the method further includes:

In step 706, the middle frame 600 is placed inside a cavity enclosed by the back plate and the display panel.

Correspondingly, step 703 includes: fastening the display panel to the side of the side plate distal from the bottom plate, such that the orthographic projection of the display panel on the bottom plate is partially overlapped with the orthographic projection of the side plate on the bottom plate, and the display panel is disposed on a side of a surface of the middle frame 600 distal from the bottom plate. Step 704 includes: filling a cavity defined by the fixture, the side plate, the middle frame 600, and the display panel with an adhesive material, such that the adhesive material bonds the non-light-emitting surface of the display panel to the surface of the side plate distal from the bottom plate, and the adhesive material is bonded to the side surface of the display panel.

In this way, during injection of the adhesive material, the middle frame 600 can block the adhesive material and prevent the adhesive material from flowing into the cavity enclosed by the back plate and the display panel, such that the orthographic projection of the adhesive layer on the bottom plate is staggered from the orthographic projection of the display region of the display panel on the bottom plate, and a surface of the formed adhesive layer facing the cavity is in contact with the middle frame 600. In other words, the middle frame 600 is configured to restrict the adhesive layer from flowing into the cavity, such that the adhesive material can be prevented from entering the backlight, thereby ensuring that the display device has better display picture quality, and a higher yield rate is achieved.

The function of the middle frame 600 may be implemented by setting a surface of the middle frame 600 distal from the bottom plate above the surface of the side plate distal from the bottom plate. Optionally, to effectively ensure the blocking effect of the middle frame 600 on the adhesive layer, the surface of the middle frame 600 distal from the bottom plate is in contact with the non-light-emitting surface of the display panel. In this way, the non-light-emitting surface of the display panel, the middle frame 600, and the side plate can form a relatively closed cavity. When the adhesive material for forming the adhesive layer is injected into the cavity, the middle frame 600 can effectively block the adhesive material, thereby further reducing a probability that the adhesive material flows into the cavity enclosed by the back plate and the display panel.

In some embodiments, the surface of the middle frame 600 distal from the bottom plate is 0.2 mm to 1 mm above the surface of the side plate distal from the bottom plate. This can help achieve a thin and light design of the display device while ensuring the yield rate of the display device.

In addition, to ensure that the middle frame 600 exerts no impact on the backlight providing the display panel with light required for display, an orthographic projection of the middle frame 600 on the bottom plate is staggered from the orthographic projection of the display region of the display panel on the bottom plate.

In addition, the middle frame 600 is further in contact with a surface of the side plate facing the cavity. Alternatively, a surface of the middle frame 600 facing distal from the cavity may be in contact with a surface of the side plate facing the cavity through the adhesive layer. When the middle frame 600 is further in contact with the surface of the side plate facing the cavity, the adhesive material can be prevented from flowing into a gap between the side plate and the middle frame 600.

In some embodiments, the middle frame 600 is made of a plastic material or a metal material. For example, the middle frame 600 is made of aluminum, PC, or ABS.

In some embodiments, the back plate and the display panel enclose a cavity. A protrusion is formed on one side, proximal to the cavity, of the surface of the side plate distal from the bottom plate. In this case, step 704 includes: filling a cavity defined by the fixture, the side plate, the protrusion, and the display panel with an adhesive material.

The protrusion is disposed such that when an adhesive material for forming the adhesive layer is injected, the protrusion can block the adhesive material and prevent the adhesive material from flowing into the cavity enclosed by the back plate and the display panel, such that the orthographic projection of the adhesive layer on the bottom plate is staggered from the orthographic projection of the display region of the display panel on the bottom plate, and the protrusion is in contact with a surface of the adhesive layer facing the cavity. In other words, the protrusion is configured to restrict the adhesive layer from flowing into the cavity, such that the adhesive material can be prevented from entering the backlight, thereby ensuring that the display device has better display picture quality, and a higher yield rate is achieved.

In some embodiments, to effectively ensure the blocking effect of the protrusion on the adhesive layer, a top end of the protrusion is in contact with the non-light-emitting surface of the display panel. In this way, the non-light-emitting surface of the display panel, the protrusion, and the side plate can form a relatively closed cavity. When the adhesive material for forming the adhesive layer is injected into the cavity, the protrusion can effectively block the adhesive material, thereby further reducing a probability that the adhesive material flows into the cavity enclosed by the back plate and the display panel.

In addition, the adhesive layer may be obtained by curing a paste-like adhesive material. In this way, the adhesive material coated on the side plate is initially in a form of a paste that does not flow. The orthographic projection of the adhesive layer obtained from the adhesive material on the bottom plate can be controlled to be staggered from the orthographic projection of the display region of the display panel on the bottom plate by controlling a coating position of the adhesive material and an operation of bonding the non-light-emitting surface of the display panel to the adhesive material. For example, the adhesive layer may be obtained by curing thermally conductive silicone. In this case, regardless of whether the display device is or is not provided with the middle frame 600 and the protrusion, the adhesive layer can be bonded to the non-light-emitting surface of the display panel and also bonded to the side surface of the display panel, and the adhesive layer does not enter the display region, thereby ensuring display performance of the display device.

In some embodiments, the display device may be any product or component with a display function, such as electronic paper, a mobile phone, a tablet computer, a TV, a display, a notebook computer, a digital photo frame, or a navigator.

In conclusion, in the method for manufacturing the display device according to this embodiment of the present disclosure, the manufactured adhesive layer is not only bonded to the non-light-emitting surface of the display panel, but also bonded to the side surface of the display panel. This increases a bonding region between the adhesive layer and the display panel, such that solidity of the bonding between the adhesive layer and the display panel can be enhanced by increasing the boding region therebetween, thereby ensuring bonding strength of the display panel, and facilitating borderless design of the display device.

In the description of the present disclosure, it should be understood that orientations or position relationships indicated by terms such as "central," "longitudinal," "transversal," "length," "width,", "thickness," "upper," "lower," "front," "back," "left," "right," "vertical," "horizontal," "top,", "bottom," "inner," "outer," "clockwise," counterclockwise," "axial," "radial," and "circumferential," and the like are orientations or position relationships shown based on the accompanying drawings, and these terms are merely intended to facilitate the description of the present disclosure or simplify the description, instead of indicating or implying that the mentioned device or components must have a particular orientation or be constructed and operated in a particular orientation. Therefore, these terms should not be construed as limitations to the present disclosure.

In the description of this specification, the description with reference to the terms such as "one embodiment," "some embodiments," "an example," "a specific example," or "some examples," and the like means that the specific features, structures, materials, or features described with reference to the embodiment or example are included in at least one embodiment or example of the present disclosure. In this specification, the illustrative expressions of the above terms do not necessarily refer to a same embodiment or example. Moreover, the specific features, structures, materials, or characteristics described may be combined in a suitable manner in any one or more embodiments or examples. In addition, a person skilled in the art may combine different embodiments or examples described in this specification and features of the different embodiments or examples without mutual contradiction.

Although the embodiments of the present disclosure have been illustrated and described, it may be understood that the above embodiments are examples instead of limitations to the present disclosure. A person of ordinary skill in the art can make various changes, modifications, replacements, and variations on the above embodiments within the scope of the present disclosure.

What is claimed is:

1. A display device, comprising:
    a back plate, wherein the back plate is provided with an L-shaped bent portion, the bent portion comprising a bottom plate and a side plate;
    a display panel, wherein the display panel is disposed on one side of the side plate distal from the bottom plate, and an orthographic projection of the display panel on the bottom plate is partially overlapped with an orthographic projection of the side plate on the bottom plate; and
    an adhesive layer, wherein the adhesive layer is configured to bond a non-light-emitting surface of the display panel to a surface of the side plate distal from the bottom plate, the adhesive layer is further configured to bond to a side surface of the display panel, the side surface being configured to connect a light-emitting surface and the non-light-emitting surface of the display panel, and an orthographic projection of the adhesive layer on the bottom plate is staggered from an orthographic projection of a display region of the display panel on the bottom plate.

2. The display device according to claim 1, wherein the orthographic projection of the side plate on the bottom plate is staggered from an orthographic projection of a display region of the display panel on the bottom plate.

3. The display device according to claim 1, wherein the display device further comprises a middle frame, wherein the middle frame is received inside a cavity enclosed by the back plate and the display panel, and the middle frame is in contact with a surface of the adhesive layer facing the cavity.

4. The display device according to claim 3, wherein a surface of the middle frame distal from the bottom plate is in contact with the non-light-emitting surface of the display panel.

5. The display device according to claim 3, wherein the middle frame is further in contact with a surface of the side plate facing the cavity.

6. The display device according to claim 3, wherein the middle frame is made of a plastic material.

7. The display device according to claim 3, wherein a surface of the middle frame distal from the bottom plate is 0.2 mm to 1 mm above the surface of the side plate distal from the bottom plate.

8. The display device according to claim 1, wherein the back plate and the display panel enclose a cavity, a protrusion is formed on one side, proximal to the cavity, of the surface of the side plate distal from the bottom plate, and the protrusion is in contact with a surface of the adhesive layer facing the cavity.

9. The display device according to claim 8, wherein a top end of the protrusion is in contact with the non-light-emitting surface of the display panel.

10. The display device according to claim 1, wherein the adhesive layer is obtained by curing a paste-like adhesive material.

11. The display device according to claim 1, wherein the adhesive layer is obtained by curing an opaque optical clear resin (OCR).

12. The display device according to claim 1, wherein a height difference between a surface of the adhesive layer distal from the bottom plate and the light-emitting surface of the display panel is within a range of [−0.5 mm, 0.5 mm].

13. The display device according to claim 1, wherein a distance between an outer edge of an orthographic projection of the adhesive layer on the bottom plate and an outer edge of the orthographic projection of the side plate on the bottom plate is within a range of [−0.5 mm, 0.5 mm].

14. The display device according to claim 1, wherein either a fillet or a chamfer is formed at a corner of the adhesive layer not in contact with the display panel or the side plate.

15. A method for manufacturing a display device, comprising:
    obtaining a back plate, wherein the back plate is provided with an L-shaped bent portion, the bent portion comprising a bottom plate and a side plate;
    fastening a fixture to an outer surface of the side plate, wherein a surface of the fixture distal from the bottom plate is above a surface of the side plate distal from the bottom plate;
    fastening a display panel to one side of the side plate distal from the bottom plate, such that an orthographic projection of the display panel on the bottom plate is partially overlapped with an orthographic projection of the side plate on the bottom plate, and the surface of the fixture distal from the bottom plate is above a light-emitting surface of the display panel;
    filling a cavity defined by the fixture, the side plate, and the display panel with an adhesive material, such that the adhesive material bonds a non-light-emitting surface of the display panel to the surface of the side plate distal from the bottom plate, and the adhesive material is bonded to a side surface of the display panel, wherein the side surface is configured to connect the light-emitting surface and the non-light-emitting surface of the display panel; and
    obtaining an adhesive layer by curing the adhesive material, and obtaining the display device by removing the fixture, wherein an orthographic projection of the adhesive layer on the bottom plate is staggered from an orthographic projection of a display region of the display panel on the bottom plate.

16. The method according to claim 15, wherein before the fastening a display panel to one side of the side plate distal from the bottom plate, the method further comprises:
    placing a middle frame inside a cavity enclosed by the back plate and the display panel;
    wherein the middle frame is in contact with a surface of the adhesive layer facing the cavity.

17. The method according to claim 15, wherein the back plate and the display panel enclose a cavity, a protrusion is formed on one side, proximal to the cavity, of the surface of the side plate distal from the bottom plate, and the protrusion is in contact with a surface of the adhesive layer facing the cavity.

18. The method according to claim 15, wherein a distance between a side surface of the display panel and a side surface of the fixture proximal to the display panel is not less than 0.5 mm.

19. The method according to claim 15, wherein one end of the fixture distal from the bottom plate is provided with a bent structure, the bent structure being configured to press a corner of the adhesive layer not in contact with the display panel or the side plate, such that either a fillet or a chamfer is formed at the corner.

\* \* \* \* \*

UNITED STATES PATENT AND TRADEMARK OFFICE
CERTIFICATE OF CORRECTION

| | | |
|---|---|---|
| PATENT NO. | : 11,366,347 B2 | Page 1 of 1 |
| APPLICATION NO. | : 17/213275 | |
| DATED | : June 21, 2022 | |
| INVENTOR(S) | : Junjie Guo, Zhihua Sun and Jian Li | |

It is certified that error appears in the above-identified patent and that said Letters Patent is hereby corrected as shown below:

On the Title Page

Item (73) should read as follows:
(73) Assignees: Beijing BOE Display Technology Co., LTD., Beijing (CN); BOE Technology Group Co., LTD, Beijing (CN)

Signed and Sealed this
Twenty-seventh Day of September, 2022

Katherine Kelly Vidal
*Director of the United States Patent and Trademark Office*